May 3, 1966   A. SCHUSTER ETAL   3,249,015
METHOD AND APPARATUS FOR TRUING ROTARY MEMBERS
Filed Jan. 25, 1965   2 Sheets-Sheet 1

Inventors
ANTON SCHUSTER
JOSEF REICHENSTETTER
BY Michael J. Striker
their ATTORNEY Inventors
ANTON SCHUSTER
JOSEF REICHENSTETTER
BY
their ATTORNEY 3,249,015
METHOD AND APPARATUS FOR TRUING
ROTARY MEMBERS
Anton Schuster and Josef Reichenstetter, Munich, Germany, assignors to Carl Hurth Maschinen- und Zahnradfabrik, Munich, Germany
Filed Jan. 25, 1965, Ser. No. 427,597
Claims priority, application Germany, Feb. 4, 1964, H 51,583
17 Claims. (Cl. 90—11)

The present invention relates to a method and apparatus for truing or centering gears, hobs and other types of annular rotary members. More particularly, the invention relates to a method and device for eliminating deformation of mandrels which extend through and are provided with stops to clamp the axial ends of annular rotary members.

In many machine tools, annular tools, workpieces or other rotary members must be mounted on rotary mandrels which are driven to thereby transmit rotation to such rotary members. Alternatively, the rotary member may be driven by a meshing gear or the like to rotate the mandrel. As a rule, the mandrel carries a flange or a similar stop which abuts against one axial end of the rotary member and the mandrel meshes with a nut which constitutes a stop at the other end of the rotary member. Many hobs are mounted in such fashion. Difficulties arise when the rotary member must be centered with utmost precision, i.e., when the axis of the mandrel must coincide exactly with the axis of the rotary member and with the desired axis of rotation which latter is determined by the mounting of the mandrel in a tool holder or the like. Even minor inaccuracies in machining of end faces on the rotary member, of that end face on the flange or nut which abuts against the rotary member, and/or in the formation of meshing threads on the nut and mandrel will cause the mandrel to run out of true thus compelling the rotary member to wobble, to knock or to otherwise deviate from an ideal path. Such wobbling is difficult to eliminate, mainly because adjustment would have to be made by changing the axial position of the nut which often constitutes the main cause that the mandrel runs out of true.

Accordingly, it is an important object of the present invention to provide a very simple method of truing a rotary member which is mounted between a pair of axially spaced stops on a rotary mandrel.

Another object of the invention is to provide a method according to which the axial position of the stops need not be changed in order to true the rotary member and according to which such truing may be carried out in a very simple and time-saving operation which may be performed by resorting to readily available tools.

A further object of the invention is to provide a method of truing hobs, gears and other types of annular members which revolve with a mandrel according to which such truing may be carried out when the mandrel is actually mounted in a machine or in a workshop, i.e., when the mandrel is removed from its holder and is disconnected from its bearings.

An additional object of the present invention is to provide a novel device for truing annular rotary members on a mandrel and to construct the truing device in such a way that its component parts may remain in place when the rotary member is in actual use so that the latter may be trued whenever the operators detect that the mandrel is deformed, be it while the machine is running, while the machine is idle, or while the mandrel is detached from its holder.

A concomitant object of the invention is to provide a device of the just outlined characteristics which may be utilized in all such types of machines where a rotary member is coupled for rotation to a mandrel and is held against axial movement by a pair of stops which are connected to the mandrel.

Still another object of the invention is to provide a truing device which may be manipulated by semiskilled persons, which adds little to the weight of the machine in which it is used, and which is subjected to negligible wear and tear so that it may be used for practically unlimited periods of time.

Briefly stated, one feature of our invention resides in the provision of a method of truing an annular gear-shaped article or a similar rotary member between a pair of axially spaced stops fixed to a rotary mandrel whose axis bulges to one side of the desired axis of rotation so that the mandrel runs out of true. The method comprises the step of gradually increasing the distance between one end of the rotary member and the corresponding stop at the other side of the desired axis of rotation so that the rotary member transmits increasing pressure to the other stop at the other side of the desired axis with resultant gradual bending or flexing of the mandrel until the axis of the mandrel coincides with the desired axis of rotation. Such flexing (or, better to say, straightening) of the mandrel is due to tensioning stresses which are transmitted thereto in response to movement of one stop away from the other stop at that side of the desired axis of rotation which is located opposite the bulge. Bulging of the mandrel is due mainly to the fact that the one and/or the other stop subjects the corresponding end face of the annular rotary member to unbalanced compressive stresses with resultant unequal or unbalanced stretching of the mandrel. At least one of the stops may comprise a nut or a washer which is movable axially in response to rotation of the nut, and the means for increasing the distance between one end of the rotary member and the corresponding stop may comprise one or more screws, bolts, wedges, pins or similar elements which are preferably mounted in one or both stops and are movable axially or radially with reference thereto so as to subject the rotary member to axially parallel but eccentric compressive stresses.

The novel features which are considered as characteristic of the invention are set forth in particular in the appended claims. The improved truing device itself, however, both as to its construction and its mode of operation, together with additional features and advantages thereof, will be best understood upon persual of the following detailed description of certain specific embodiments with reference to the accompanying drawings, in which:

Figure 1:
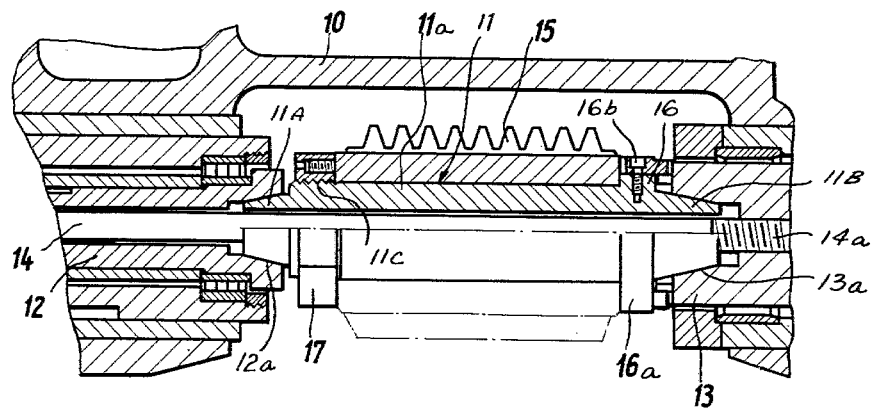
FIG. 1 is a fragmentary axial section through the tool holder of a gear shaping machine embodying a truing device which is constructed in accordance with a first embodiment of our invention.

Referring first to FIG. 1, there is shown a portion of a gear shaping machine, for example, a hobbing machine which embodies a truing device serving to center a rotary member in the form of an annular gear-shaped article 15. The machine comprises a tool holder 10 which accommodates an elongated rotary mandrel 11, the latter being mounted between a pair of spaced supports or tailstocks 12, 13. The tips 11A, 11B of the mandrel are of conical shape and extend into complementary recesses 12a, 13a of the tailstocks 12, 13. The toll holder 10 comprises means, including a spindle 14, for safely anchoring the mandrel 11 between the tailstocks 12, 13 by forcing the tips 11A, 11B into the corresponding recesses 12a, 13a. The right-hand end portion 14a of the spindle 14 is threaded into the tailstock 13 and its other end portion is subjected to tensional stresses so that the tailstock 13 is urged toward the tailstock 12. The tailstock 13 is movable in the axial direction of the spindle 14 but the tailstock 12 is held against axial movement; such construction allows for rapid detachment of the mandrel 11 simply by releasing the left-hand end portion of the spindle 14 and by shifting the tailstock 13 in a direction away from the tailstock 12.

The rotary member 15 is non-rotatably but axially movably coupled to the median portion 11a of the mandrel 11 which comprises a first end portion in the form of an annular stop flange 16. This flange carries an annulus 16a which is non-rotatably fixed thereto by one or more radial screws 16b. The other end portion of the mandrel 11 is provided with external threads 11c meshing with a second stop, here shown as a nut 17, which bears against the left-hand end face of the rotary member 15 and causes it to abut against the stop flange 16. Since it is practically impossible to insure that the end faces of the rotary member 15 are located in two parallel planes which are absolutely normal to the axis of the mandrel 11, that the left-hand end face of the stop flange 16 is finished with absolute precision, that the right-hand end face of the nut 17 is finished with absolute precision, and/or that there is absolutely no radial or axial play between the internal threads of the nut 17 and the threads 11c of the spindle 11, the rotary member 15 is subjected to unbalanced compressive stresses which tend to bulge the median portion 11a of the mandrel 11 so that the axis of the mandrel does not coincide with the desired axis of rotation and the rotary member 15 would normally run out of true.

Figure 1A:
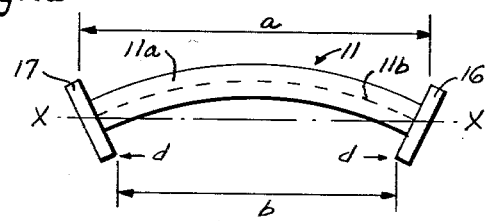
FIG. 1a is a side elevational view of a deformed mandrel which is to be trued by the device shown in FIG. 1.

The manner in which we propose to true the rotary member 15 will be best understood with reference to FIG. 1a which shows the median portion 11a of the mandrel 11 in deformed condition. The deformation (bulge) of the mandrel has been exaggerated for the sake of clarity, and it will be seen that the axis 11b of the mandrel bulges to one side of an axis X—X which is the desired axis of rotation. The purpose of our method and truing device to redeform the mandrel 11 so as to insure that the axis 11b will concide with the axis X—X. As stated before, bulging or bending of the median portion 11a is due to unbalanced compressive stresses to which the rotary member 15 is subjected by the flange 16 and nut 17, and such unbalanced compressive stresses cause certain portions of the flange 16 and nut 17 to be more distant from each other than the remaining portions of these parts. FIG. 1a shows the distance a which is the distance between the upper portions of the flange 16 and nut 17, and this distance exceeds the distance b between the lower portions of the flange 16 and nut 17. The deformation of the axis 11b can be eliminated by subjecting the lower portions of the flange 16 and nut 17 to eccentric but substantially axially oriented stresses which tend to increase the distance b so that the latter will approximate the distance a. The direction of such stresses is indicated by arrows d, and it will be readily understood that such stresses result in tensioning or lengthening of the median portion 11a with resultant straightening of the axis 11b.

That plane which is normal to the plane of FIG. 1a and passes through the axis 11b of the mandrel 11 is the so-called neutral plane in which the material of the median portion 11a is not subjected to tensional or compressive stresses. Prior to truing, the upper portion of the mandrel 11 (as the parts appear in FIG. 1a) above the neutral plane is subjected to tensional stresses, and the lower portion of this mandrel beneath the neutral plane is subjected to compressive stresses. In response to truing, i.e., in response to generation of tensional stresses acting in directions indicated by arrows d, the lower portion of the mandrel 11 will be extended axially until the axis 11b coincides with the desired axis X—X.

It can be said that our method of truing comprises the step of bending the mandrel 11 in a sense opposite to that in which the mandrel bulges in response to unbalanced compression of the rotary member 15, and that such bending is carried out without allowing the distance a to decrease, i.e., the bulge is not eliminated by flexing the mandrel in such a way that the side which was under tension then undergoes compression but rather by keeping the upper portion of the mandrel under tension and by additionally subjecting the lower portion to the mandrel to tensional stresses.

Figure 2:
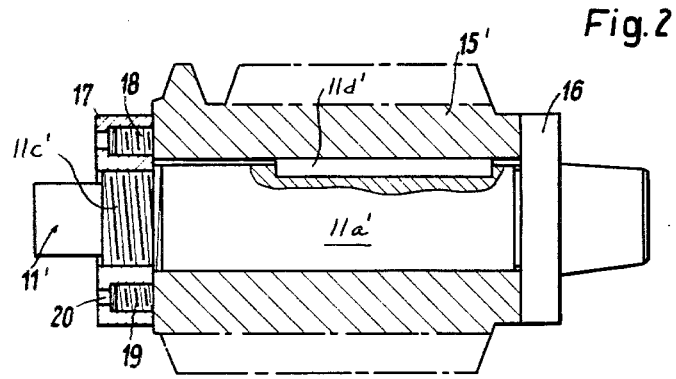
FIG. 2 is a side elevational view of a modified truing device with certain parts shown in axial section.

FIG. 2 illustrates a slightly modified mandrel 11' whose median portion 11a' is non-rotatably coupled with a hob 15' by means of a key 11d'. One end face of the hob 15' abuts against the stop flange 16 and the other end face of the hob bears against the stop nut 17. The nut 17 is provided with several (e.g., six) equidistant eccentric axially parallel tapped through bores 20 each of which receives a threaded element here shown as a headless screw 18 or 19. The flange 16 and the nut 17 subject the hob 15' to unbalanced compressive stresses as a result of which the axis of the median portion 11a' of the mandrel 11' bulges upwardly and above the desired axis of rotation. Such bulging of the mandrel is very small so that it cannot be seen in FIG. 2; however, it would suffice to make the mandrel and the hob 15' run out of true. Unbalanced running of the hob is undesirable when the truing device of FIG. 2 is used for precision finishing of gears or similar workpieces.

The means for truing the hob 15' and mandrel 11' includes the aforementioned screws 18, 19. In fact, and when the axis of the median portion 11a' bulges upwardly, as viewed in FIG. 2, only the screw 19 must be rotated to subject the lower half of the median portion 11a' to tensional stresses which cause the axis of the mandrel to coincide with the desired axis of rotation. Thus, the operator simply resorts to a screwdriver or a similar tool which is inserted through the lower through bore 20 and the screw 19 is rotated so that its tip abuts against and subjects the lower portion of the left-hand end face on the hob 15' to compressive stresses. The hob 15' transmits such stresses to the lower portion of the flange 16 which is rigid with the mandrel 11' whereby the latter begins to straighten out until the axis of its median portion 11a' coincides with the desired axis of rotation. It will be noted that the screw 19 is located at the underside of the desired axis of rotation, namely, at the side which is opposite the bulge of the median portion 11a'. The hob 15' and the mandrel 11' may be trued in a workshop prior to insertion of the mandrel into the work holder 10 of a hobbing machine. It is obvious that the method and truing device of our invention can find useful application in all such types of machines wherein an annular rotary member must be accurately centered on a rotary mandrel.

The left-hand ends of the screws 18, 19 are formed with hexagonal recesses (not shown) so that they may receive the working end of a screwdriver. The tip of the screw 19 actually constitutes a projection which serves to increase the distance between the lower portion of the nut 17 and the adjacent portion of the left-hand end face on the hob 15' so that the latter transmits to the lower portion of the flange 16 a pressure which causes a lengthening and resultant straightening of the median portion 11a'. If the axis of the median portion 11a' bulges to another side of the desired axis of rotation, the operator will adjust the axial position of another screw until the axis of the mandrel coincides with such desired axis of rotation. It was found that six screws 18, 19 suffice to insure satisfactory truing of the hob 15'. Unbalanced axial compression of the hob 15' between the flange 16 and nut 17 is normally due to the fact that the nut will have at least some radial play with reference to the threaded portion 11c' of the mandrel 11' and that such radial displacement of the nut will move its right-hand end face into a plane which is not exactly normal to the desired axis of rotation. In other words, only a portion of the nut 17 bears against the left-hand end face of the hob 15', and this causes unbalanced compression of the hob with resultant bulging of the median portion 11a'. In FIG. 2, the upper portion of the nut 17 bear directly against the left-hand end face of the hob 15'; therefore, the upper part of the median portion 11a, is under tension while the lower part of the median portion 11a' undergoes compression unless the operator causes the tip of the screw 19 to project beyond the nut and into actual engagement with the hob.

It is obvious that the nut 17 need not come in direct abutment with any portion of the hob 15'. Thus, the tips of all screws 18, 19 may extend beyond the right-hand end face of the nut 17 so that the left-hand end face of the hob is engaged solely by the tips of two or more screws. In such instance, all of the screws but the one which is used for truing can be considered as constituting integral parts of the nut 17 and mandrel 11'. The screws 18, 19 are rotated until the hob 15' runs true, i.e., until the axis of the median portion 11a' coincides with the desired axis of rotation.

In many cases, the truing device may comprise a single screw 18 or 19. In such truing devices, the nut 17 is simply rotated to move the screw into a position corresponding to the position of the screw 19 shown in FIG. 2 so that the tip of the screw will cause a stretching of the mandrel and resultant return of the axis 11b into a position of coincidence with the desired axis of rotation. The screw 18 of FIG. 1 corresponds to the screw 18 of FIG. 2.

The mandrel 11 or 11' may be trued in a workshop, for example, after the teeth of the rotary member 15 or 15' are sharpened and before the mandrel is reinserted between its supports 12, 13. The thus trued mandrel is then ready to replace a mandrel which was in actual use. The nut 17 may be a hexagonal nut so that it may be rotated by resorting to a conventional spanner; alternatively, the nut may be knurled so that it can be rotated by hand. This nut need not be machined with utmost precision and may consist of lower grade (unhardened) metal since the rotary member 15 or 15' can be trued by adjusting the axial position of the screws 18, 19 so that (and as mentioned hereinabove) the nut need not come in actual contact with the rotary member.

Figure 3:
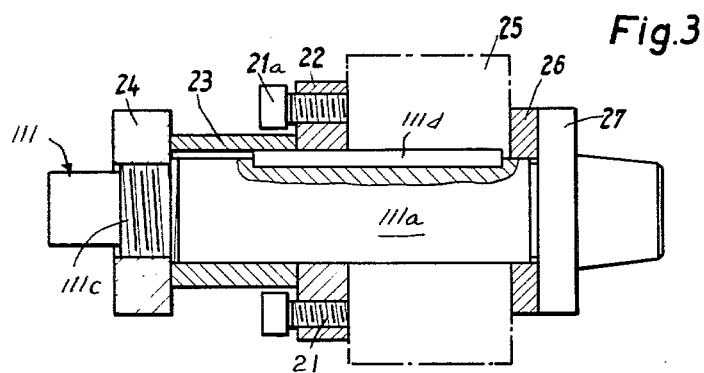
FIG. 3 is a similar view of a third truing device.

FIG. 3 illustrates a modified truing device wherein the median portion 111a of the mandrel 111 carries a rather short annular rotary member 25. This member is non-rotatably but axially movably coupled to the median portion 111a by a key 111d. The right-hand end portion of the mandrel 111 comprises an integral annular stop flange 27 which locates an annular spacer or washer 26. The externally threaded left-hand end portion 111c of the mandrel 111 meshes with a nut 24 which does not come in direct compressive engagement with the rotary member 25. The truing device of FIG. 3 further comprises spacer means including a washer 22 which bears against the left-hand end face of the rotary member 25 and an elongated sleeve 23 which extends between the washer 22 and nut 24. The means for truing the member 25 and mandrel 111 comprises a series of equidistant screws 21 whose heads 21a are readily accessible and whose stems are threaded into eccentric axially parallel tapped bores provided in the washer 22. The washers 22, 26 subject the rotary member 25 to unbalanced compressive stresses which would normally result in bulging of the median portion 111a. Such bulging is prevented by causing the tip of one of the screws 21 to project beyond the right-hand end face of the washer 22 and in actual compressive engagement with the left-hand end face of the rotary member 25. The pressure which the washer 22 transmits to the rotary member 25 is generated by and depends on the axial position of the nut 24. It will be noted that the key 111d also serves to hold the washer 22 and sleeve 23 against rotation with reference to the mandrel 111.

Figure 4:
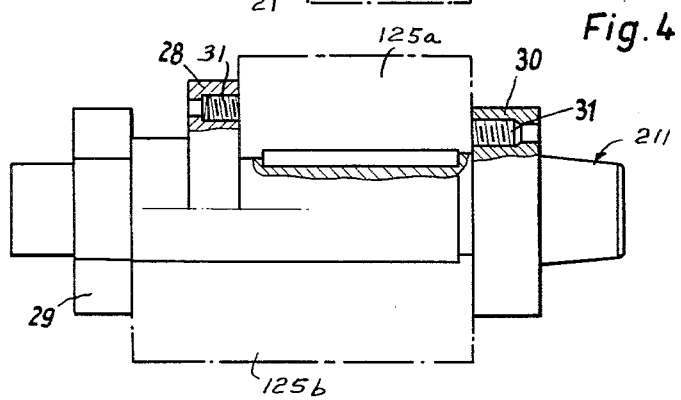
FIG. 4 is a side elevational view of a fourth truing device.

FIG. 4 illustrates a further truing device which may be utilized in connection with shorter or longer rotary members 125a or 125b. If utilized in connection with the shorter member 125a, the truing device will comprise a fixed stop flange 30 and an axially movable nut 28. The nut 29 is used when the device is to center the longer rotary member 125b. The device of FIG. 4 comprises truing means in the form of screws 31 which are provided in the flange 30 and nut 28. Each of these parts may be provided with four or more equidistant screws 31, and the arrangement is preferably such that the screws 31 of the flange 30 are staggered angularly with reference to the screws 31 of the nut 28. The operator can then choose between the left-hand and right-hand sets of screws 31 when he decides to stretch the mandrel 211 so that its axis will coincide with the desired axis of rotation. It is also clear that the operator may manipulate one of the screws 31 in the flange 30 and one of the screws in the nut 28 so that the rotary member 125a will be trued from both ends of the mandrel. The member 125a may be received between washers so that it need not come in actual abutment with the flange 30 and nut 28. The nut 29 may be constructed in the same way as the nut 28, but it is also possible to use a nut 29 which is without screws 31 so that the longer rotary member 125b will be trued by manipulating one of the screws 31 in the flange 30. Obviously, the flange 30 may be replaced by a nut if the right-hand end portion of the mandrel 211 is provided with external threads.

A very important advantage of the device which is shown in FIG. 4 is that the mandrel 211 and rotary member 125a may be trued with utmost precision. This will be readily understood by assuming that each of the stops 28, 30 is provided with six equidistant screws 31. By moving the nut 28 into an axial position in which its screws are staggered angularly with reference to the screws in the flange 30, the operator is practically assured to have moved one of the screws 31 in a position diametrically opposite the bulge in the median portion of the mandrel 211. It is also clear that the screws 31 of the nut 28 and flange 30 may be used to adjust the axial position of the rotary member 125a.

Figure 5:
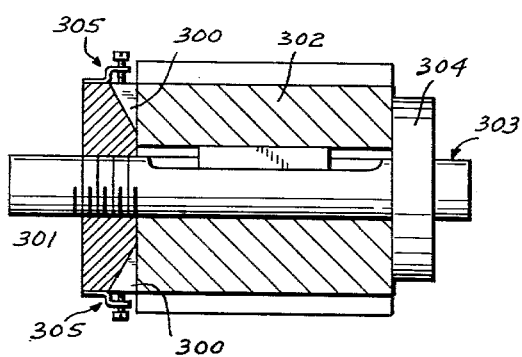
FIG. 5 is a side elevational view of a further truing device with radially movable truing elements.

FIG. 5 shows a portion of a further truing device wherein the axially extending screws 18, 19, 21, 31 are replaced by radially extending inserts in the form of wedges 300. Such wedges may be provided at equal distance from each other and may be driven into the space between a stop nut 301 and the corresponding end face of the rotary member 302 which is coupled to the median portion of a mandrel 303. The other end face of the rotary member 302 bears against an annular stop flange 304. FIG. 5 also shows rudimentary devices 305 which may be used for moving the wedges 300 toward the axis of the mandrel 303.

Without further analysis, the foregoing will so fully reveal the gist of the present invention that others can, by applying current knowledge, readily adapt it for various applications without omiting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of truing a rotary member located between a pair of stops fixed to a rotary mandrel whose axis bulges to one side of the desired axis of rotation so that the mandrel runs out of true, comprising the step of increasing the distance between one end of the rotary member and the corresponding stop at the other side of the desired axis of rotation so that the rotary member transmits increasing pressure to the other stop at said other side of the desired axis of rotation with resultant bending and straightening of the mandrel until the axis of the mandrel coincides with the desired axis of rotation.

2. A method of truing a gear-shaped article or a similar rotary member on a rotary mandrel, comprising the steps of fixing the rotary member between a pair of stops secured to the mandrel at axially spaced points thereof and exerting unbalanced compressive stresses upon the corresponding ends of the rotary member so that the axis of the mandrel bulges to one side of the desired axis of rotation and runs out of true; and increasing the distance between one end of the rotary member and the corresponding stop at the other side of the desired axis of rotation so that the rotary member transmits increasing pressure to the other stop at said other side of the desired axis of rotation with resultant bending and straightening of the mandrel until the axis of the mandrel coincides with the desired axis of rotation.

3. A method of truing an annular rotary member on a rotary mandrel, comprising the steps of non-rotatably inserting the mandrel into the rotary member so that the latter is compelled to share all angular movements of the mandrel; fixing the rotary member between a pair of axially spaced stops on the mandrel so that the stops tend to compress the rotary member whereby at least one thereof subjects the rotary member to unbalanced compressive stresses with resultant bulging of the mandrel to one side of the desired axis of rotation so that the mandrel runs out of true; and gradually increasing the distance between one end of the rotary member and the corresponding stop at the other side of the desired axis of rotation so that the rotary member transmits a gradually increasing pressure to the other stop at said other side of the desired axis of rotation with resultant gradual bending of the mandrel until the axis of the mandrel coincides with the desired axis of rotation.

4. A method of truing an annular rotary member located between and abutting against a pair of axially spaced stops fixed to a rotary mandrel whose axis bulges to one side of the desired axis of rotation so that the mandrel runs out of true, comprising the step of increasing the distance between one end of the rotary member and the corresponding stop at the other side of the desired axis of rotation by subjecting the rotary member to axially parallel eccentric compressive stresses so that the rotary member transmits increasing pressure to the other stop at said other side of the desired axis of rotation with resultant straightening of the mandrel until the axis of the mandrel coincides with the desired axis of rotation.

5. A method as set forth in claim 4 for truing an annular rotary member on a mandrel which runs out of true in response to unbalanced distribution of compressive stresses transmitted by said stops to the ends of the rotary member, further comprising the step of simultaneously increasing the distance between the other end of the rotary member and the other stop at said other side of the desired axis of rotation.

6. A truing device of the character described, comprising an elongated mandrel; an annular rotary member surrounding a median portion of said mandrel; a pair of axially spaced stops fixed to said mandrel and bearing against the respective ends of said rotary member so as to subject the rotary member to unbalanced compressive stresses in response to which the axis of said median portion tends to bulge to one side of the desired axis of rotation; and means for truing said rotary member, comprising a projection located at the other side of the desired axis of rotation and extending between one of said stops and the corresponding end of the rotary member for subjecting the rotary member to eccentric compressive stresses acting in a direction substantially parallel with the desired axis of rotation so that the other end of the rotary member transmits to the other stop a pressure which subjects the mandrel to tensioning stresses and prevents bulging of said median portion.

7. A truing device of the character described, comprising an elongated mandrel; an annular rotary member surrounding a median portion of said mandrel; means for coupling said rotary member for rotation with said mandrel; a first stop secured to said mandrel at one end of the rotary member; a second stop fixed to the mandrel at the other end of said rotary member, the distance between said stops being such that the rotary member is subjected to unbalanced compressive stresses in response to which the axis of said median portion tends to bulge to one side of a desired axis of rotation; and means for truing said rotary member, comprising at least one externally threaded element received in an axially extending eccentric tapped bore provided in one of said stops at the other side of the desired axis of rotation, said threaded element having a tip extending beyond said one stop and into compressive engagement with the corresponding end of said rotary member so that the rotary member transmits to the other stop a pressure which subjects the mandrel to tensioning stresses and prevents bulging of said median portion.

8. A truing device of the character described, comprising an elongated mandrel; an annular rotary member surrounding a median portion of said mandrel; means for coupling said rotary member for rotation with said mandrel; a first stop secured to said mandrel at one end of the rotary member; a second stop fixed to the mandrel at the other end of said rotary member, the distance between said stops being such that the rotary member is subjected to unbalanced compressive stresses in response to which the axis of said median portion tends to bulge to one side of a desired axis of rotation; and means for truing said rotary member, comprising at least one insert radially movably received between one of said stops and the corresponding end of said rotary member at said other side of the desired axis of rotation for subjecting the rotary member to eccentric compressive stresses so that the rotary transmits to the other stop a pressure which subjects the mandrel to tensioning stresses and prevents bulging of said median portion.

9. A truing device of the character described, comprising an elongated mandrel; an annular rotary member surrounding a median portion of said mandrel; a pair of stops secured to said mandrel at the ends of said rotary member, the distance between said stops being such that the rotary member is subjected to unbalanced compressive stresses in response to which said median portion tends to bulge to one side of the desired axis of rotation so that, in the absence of stresses which compensate for such unbalanced compressive stresses, said mandrel rotates out of ture; and means for truing said rotary member, comprising a plurality of angularly spaced threaded elements extending into axially parallel eccentric tapped through bores provided in at least one of said stops, at least one of said threaded elements being located at the the other side of the desired axis of rotation and having a portion extending beyond said one stop and into compressive engagement with the corresponding end of said rotary member so that said rotary member transmits to the other stop a pressure which subjects the mandrel to tensioning stresses and prevents bulging of said median portion.

10. A truing device as set forth in claim 9, wherein said threaded elements are equidistant from each other.

11. A truing device as set forth in claim 9, wherein said truing means comprises a plurality of threaded elements meshing with each of said stops and wherein the threaded elements in one of said stops are staggered angularly with reference to the threaded elements in the other stop.

12. A truing device of the character described, comprising an elongated mandrel having a median portion, a first end portion provided with an annular stop secured thereto, and an externally threaded second end portion; an annular rotary member surrounding the median portion of said mandrel; coupling means securing said rotary member for rotation to said median portion; a nut meshing with said second end potrion of the mandrel and bearing against said rotary member so that the latter abuts against said stop and is subjected to unbalanced compressive stresses in response to which said median portion of the mandrel tends to bulge to one side of a desired axis of rotation; and means for truing said rotary member, comprising at least one screw received in an axially parallel eccentric tapped through bore provided in said nut at the other side of the desired axis of rotation, said screw having a portion extending beyond said nut and into compressive engagement with said rotary member so that said rotary member transmits to said stop a pressure which subjects the mandrel to tensioning stresses and prevents bulging of said median portion.

13. A truing device of the character described, comprising an elongated mandrel having a median portion, a first end portion provided with an annular stop secured thereto, and an externally threaded second end portion; an annular rotary member surrounding the median portion of said mandrel; coupling means securing said rotary member for rotation to said median portion; a nut meshing with said second end portion; annular spacer means provided between said nut and said rotary member and bearing against the rotary member so that the latter abuts against said stop and is subjected to unbalanced compressive stresses which tend to bulge the axis of said median portion to one side of the desired axis of rotation; and means for truing said rotary member, comprising a screw received in an axially parallel eccentric tapped through bore porvided in said spacer means at the other side of the desired axis of rotation, said screw having a portion extending beyond said spacer means and into compressive engagement with said rotary member so that said rotary member transmits to said stop a pressure which subjects the mandrel to tensioning stresses and prevents bulging of said median portion.

14. In a machine tool, particularly in a gear shaping machine, in combination; a pair of spaced supporting members; an elongated mandrel having end portions journalled in said supporting members and arranged to rotate about a desired axis of rotation; an annular rotary member nonrotatably mounted on said mandrel intermediate said supporting members; a pair of stops fixed to said mandrel and bearing against the ends of said rotary member so that the latter is subjected to unbalanced compressive stresses tending to bulge the axis of said mandrel to one side of the desired axis of rotation; and means for truing said rotary member, comprising a projection extending between one of said stops and the corresponding end of said rotary member at the other side of the desired axis of rotation for subjecting the rotary member to compressive stresses so that the rotary member transmits to the other stop a pressure which subjects the mandrel to tensioning stresses and prevent bulging of the mandrel.

15. A structure as set forth in claim 14, wherein said rotary member is a gear-shaped article and wherein said supporting members are tailstocks, said projection comprising a threaded element axially movably supported by said one stop and having a tip engaging the corresponding end of said article.

16. A structure as set forth in claim 14, wherein at least one of said stops is a nut and wherein said mandrel comprises an externally threaded portion which meshes with said nut.

17. A structure as set forth in claim 14, wherein said truing means comprises at least one additional projection provided between said rotary member and the other stop.

No references cited.

WILLIAM W. DYER, JR., *Primary Examiner.*

G. A. DOST, *Assistant Examiner.*